United States Patent
Rudkowski

(10) Patent No.: US 12,522,357 B2
(45) Date of Patent: Jan. 13, 2026

(54) LARGE AIRCRAFT LAVATORY WITH STORAGE COMPARTMENTS

(71) Applicant: B/E AEROSPACE, INC., Winston Salem, NC (US)

(72) Inventor: Leon John Rudkowski, Everett, WA (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 18/403,461

(22) Filed: Jan. 3, 2024

(65) Prior Publication Data

US 2025/0214707 A1  Jul. 3, 2025

(51) Int. Cl.
B64D 11/02  (2006.01)

(52) U.S. Cl.
CPC .................. B64D 11/02 (2013.01)

(58) Field of Classification Search
CPC ..... B64D 11/02; B64D 11/04; B64D 11/0023; B61D 35/00; B61D 35/002; B61D 35/007; B61D 35/005; B60R 15/00; B60R 15/02; B60R 15/04; A47K 1/02
See application file for complete search history.

(56) References Cited

U.S. PATENT DOCUMENTS

| | | | |
|---|---|---|---|
| 4,884,767 A * | 12/1989 | Shibata | B64D 11/02 296/156 |
| 9,365,292 B2 | 6/2016 | Cook et al. | |
| 9,908,623 B2 | 3/2018 | Hashberger et al. | |
| 10,464,677 B2 | 11/2019 | McKee et al. | |
| 11,542,007 B2 * | 1/2023 | Waldheuer | B64D 11/02 |
| 2008/0265092 A1 * | 10/2008 | Cooper | B64D 11/02 244/119 |
| 2011/0253835 A1 * | 10/2011 | Cook | B64D 11/064 244/118.5 |
| 2015/0129717 A1 * | 5/2015 | Koyama | B64D 11/06 244/118.6 |
| 2015/0129718 A1 * | 5/2015 | Koyama | B64D 11/06 244/118.6 |
| 2015/0307193 A1 * | 10/2015 | Savian | B64D 11/02 244/118.5 |

(Continued)

FOREIGN PATENT DOCUMENTS

WO  2016049064  3/2016

OTHER PUBLICATIONS

European Patent Office, European Search Report dated Mar. 11, 2025 in Application No. 24223761.8.

*Primary Examiner* — Arfan Y. Sinaki
(74) *Attorney, Agent, or Firm* — SNELL & WILMER L.L.P.

(57) ABSTRACT

An aircraft lavatory is disclosed herein. The aircraft lavatory includes an aft wall, a forward wall including an upper portion and a lower portion, the lower portion configured to be directly adjacent one or more seats, and the upper portion configured to extend away from the forward wall and over the one or more seats, an outboard wall coupled to the forward wall and the aft wall, and an inboard wall coupled to the forward wall and the aft wall, the inboard wall defining an opening to access the aircraft lavatory, wherein each of the outboard wall and the inboard wall are configured to be separated into an aft side and a forward side.

15 Claims, 7 Drawing Sheets

(56) References Cited

U.S. PATENT DOCUMENTS

| | | | | |
|---|---|---|---|---|
| 2016/0176525 A1* | 6/2016 | Seibt | ............... | B64D 11/02 |
| | | | | 296/24.3 |
| 2017/0021929 A1* | 1/2017 | Mckee | ............... | B64D 11/0691 |
| 2017/0320580 A1 | 11/2017 | Roth et al. | | |
| 2018/0222587 A1* | 8/2018 | Staub | ............... | B64D 11/00 |
| 2021/0388217 A1* | 12/2021 | Gurvich | ............... | A01N 61/00 |
| 2022/0177136 A1* | 6/2022 | McIntosh | ............... | B64D 11/02 |

\* cited by examiner

__US 12,522,357 B2__

LARGE AIRCRAFT LAVATORY WITH STORAGE COMPARTMENTS

FIELD

The present disclosure generally relates aircraft lavatories, and more particularly, to larger aircraft lavatories having more space.

BACKGROUND

Aircraft lavatories are small and tend to be confining to passengers. Aircraft lavatories remain space and size constrained because the lavatory monument has to fit through the door of the aircraft. Airlines and aircraft manufacturers may desire to increase the size of the lavatories inside the aircraft.

SUMMARY

Disclosed herein is an aircraft lavatory including an aft wall, a forward wall including an upper portion and a lower portion, the lower portion configured to be directly adjacent one or more seats, and the upper portion configured to extend away from the forward wall and over the one or more seats, an outboard wall coupled to the forward wall and the aft wall, and an inboard wall coupled to the forward wall and the aft wall, the inboard wall defining an opening to access the aircraft lavatory, wherein each of the outboard wall and the inboard wall are configured to be separated into an aft side and a forward side.

In various embodiments, the aircraft lavatory further includes an upper storage compartment disposed in the upper portion and an upper storage access disposed on the inboard wall, the upper storage access configured to provide access to the upper storage compartment. In various embodiments, the aircraft lavatory further includes a lower storage compartment disposed in the lower portion and a lower storage access disposed on the inboard wall, the lower storage access configured to provide access to the lower storage compartment.

In various embodiments, the aircraft lavatory further includes a sink disposed inside the aircraft lavatory and coupled to the forward wall and a toilet coupled to the outboard wall. In various embodiments, the toilet is centered between the forward wall and the aft wall. In various embodiments, the aircraft lavatory further includes a door coupled to the inboard wall and configured to secure the opening, wherein the inboard wall has a first width and the door has a second width.

In various embodiments, the second width is about 60% to about 70% of the first width. In various embodiments, the second width is about 70% to about 95% of the first width. In various embodiments, the aircraft lavatory further includes a sink disposed inside the aircraft lavatory and coupled to the forward wall and a toilet disposed inside the aircraft lavatory and coupled to the forward wall, adjacent the sink. In various embodiments, the toilet is centered between the sink and the outboard wall.

Also disclosed herein is an aircraft including at least one lavatory that includes an aft wall, a forward wall including an upper portion and a lower portion, the lower portion configured to be directly adjacent one or more seats, and the upper portion configured to extend away from the forward wall and over the one or more seats, an outboard wall coupled to the forward wall and the aft wall, and an inboard wall coupled to the forward wall and the aft wall, the inboard wall defining an opening to access the at least one aircraft lavatory, wherein each of the outboard wall and the inboard wall are configured to be separated into an aft side and a forward side.

In various embodiments, the aircraft further includes a doorway into the aircraft having a first width, wherein the forward side has a second width that is less than the first width, the aft side has a third width that is less than the first width, and the second width and the third width combined are greater than the first width. In various embodiments, the at least one lavatory further includes an upper storage compartment disposed in the upper portion and an upper storage access disposed on the inboard wall, the upper storage access configured to provide access to the upper storage compartment.

In various embodiments, the at least one lavatory further includes a lower storage compartment disposed in the lower portion and a lower storage access disposed on the inboard wall, the lower storage access configured to provide access to the lower storage compartment. In various embodiments, the at least one lavatory further includes a sink disposed inside the at least one aircraft lavatory and coupled to the forward wall and a toilet disposed inside the at least one aircraft lavatory and coupled to the outboard wall.

In various embodiments, the at least one lavatory further includes a door coupled to the inboard wall and configured to secure the opening, wherein the inboard wall has a first width and the door has a second width. In various embodiments, the second width is about 60% to about 70% of the first width. In various embodiments, the second width is about 70% to about 95% of the first width. In various embodiments, the at least one lavatory further includes a sink disposed inside the at least one aircraft lavatory and coupled to the forward wall and a toilet disposed inside the at least one aircraft lavatory and coupled to the forward wall, adjacent the sink. In various embodiments, the toilet is centered between the sink and the outboard wall.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein, in various embodiments, is a large lavatory for use in an aircraft. In various embodiments, the large lavatory may be wider than an aircraft doorway. In various embodiments, the lavatory may be configured introduced through the aircraft doorway in separate pieces that are assembled inside the aircraft. In various embodiments, a plurality of seats may be affixed to an outer wall of the large lavatory. In various embodiments, an upper portion of the outer wall of the large lavatory may extend over the plurality of seats. In various embodiments, one or more storage compartments may be formed inside the outer wall of the large lavatory. In various embodiments, one or more access doors may be configured to provide access to the one or more storage compartments from outside of the large lavatory. In various embodiments, the interior of the large lavatory may be configured to prioritize space over user comfort. In various embodiments, the interior of the large lavatory may be configured to prioritize user comfort over space. In various embodiments, the interior of the large lavatory may be configured to balance user comfort and space.

Figure 1:
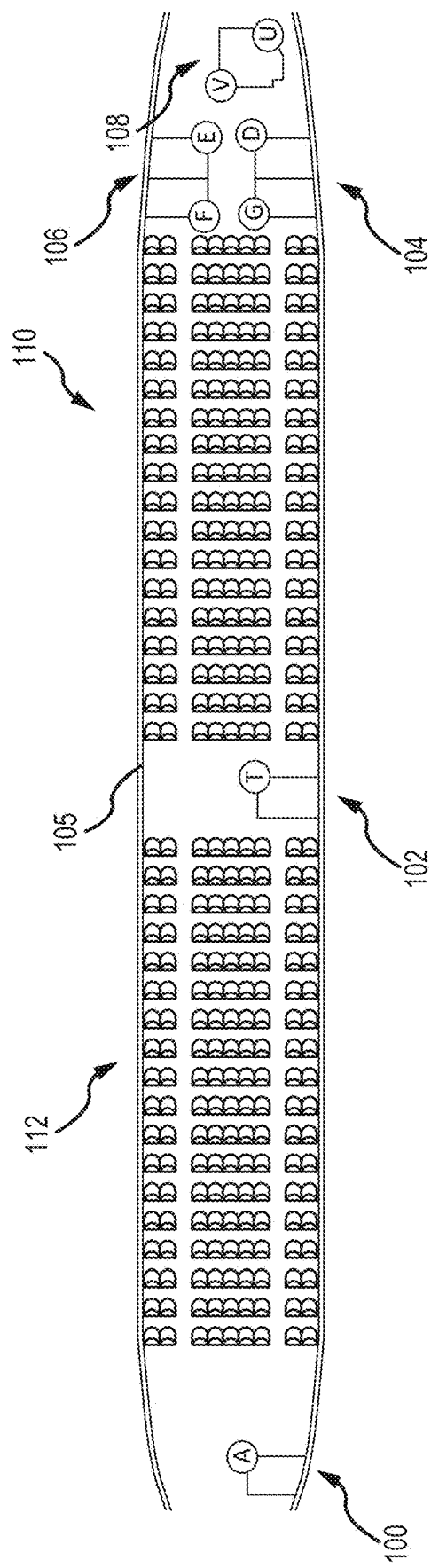
FIG. 1 illustrates a partial top view of an aircraft cabin with exemplary lavatory monuments, in accordance with various embodiments.

Referring now to FIG. 1, a partial top view of an aircraft cabin with exemplary lavatory monuments is illustrated, in accordance with various embodiments. As illustrated in FIG. 1, numerous lavatory monuments 100, 102, 104, 106, and 108 are shown with certain lavatory monuments located along an outboard wall 105 of the aircraft cabin. The aircraft cabin further includes a plurality of seats 112 that are between the lavatory monuments. Lavatory monument 100 is located approximately toward the front of the aircraft (e.g., in the negative x-direction), lavatory monument 102 is located approximately in the middle of the fuselage (e.g., near a wing), and lavatory monuments 104, 106, 108 are located toward the rear of an aircraft 110. The outboard wall 105 may be formed as a curved body of the fuselage of aircraft 110.

Lavatory monument 100 is configured to provide additional interior space for passengers. The additional space may help passengers feel less claustrophobic and have more space to move around inside of lavatory monument 100. Lavatory monuments 102, 104, 106, 108 may be configured similar to lavatory monument 100 to provide more interior space for passengers using lavatory monuments 102, 104, 106, 108. Note that the drawing is not necessarily shown to scale and is merely illustrative of one possible configuration of lavatory monuments 100, 102, 104, 106, 108 in a cabin of aircraft 110. Configuration of the aisle, cross aisle, passageway, and seats may be in any suitable arrangement that permits ingress and egress through either of the two doors provided in lavatory monuments 104, 106, 108. In various embodiments, lavatory monuments may be located in an aft portion of the aircraft (e.g., in the positive x-direction and/or near the pressure dome), or in a forward portion of the aircraft (e.g., in the negative x-direction and immediately aft of the cockpit).

In various embodiments, lavatory monuments 104, 106, 108, for example, may be designed for lateral installation, with the closed doors of lavatory monuments 104, 106, 108 facing forward or aft, depending on configuration in the fuselage. In various embodiments, the lavatory compartment doors (in the closed position) may be oriented to be parallel to an aisle, cross aisle, or passageway, such as the center aisle that runs longitudinally from front to aft in a commercial aircraft.

Figure 2A:
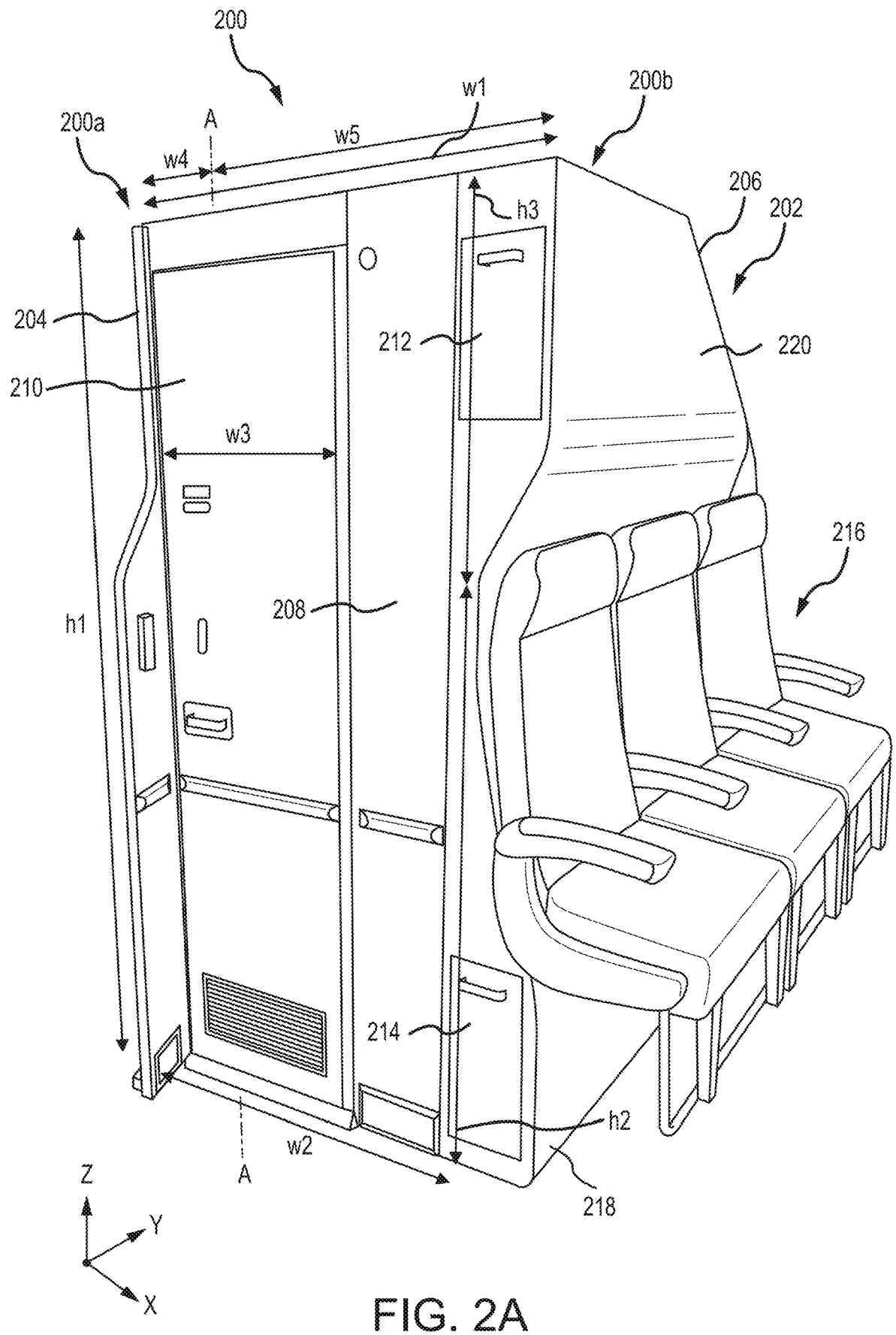
FIGS. 2A and 2B illustrate an exterior view of a large lavatory for an aircraft, in accordance with various embodiments.
Figure 2B:
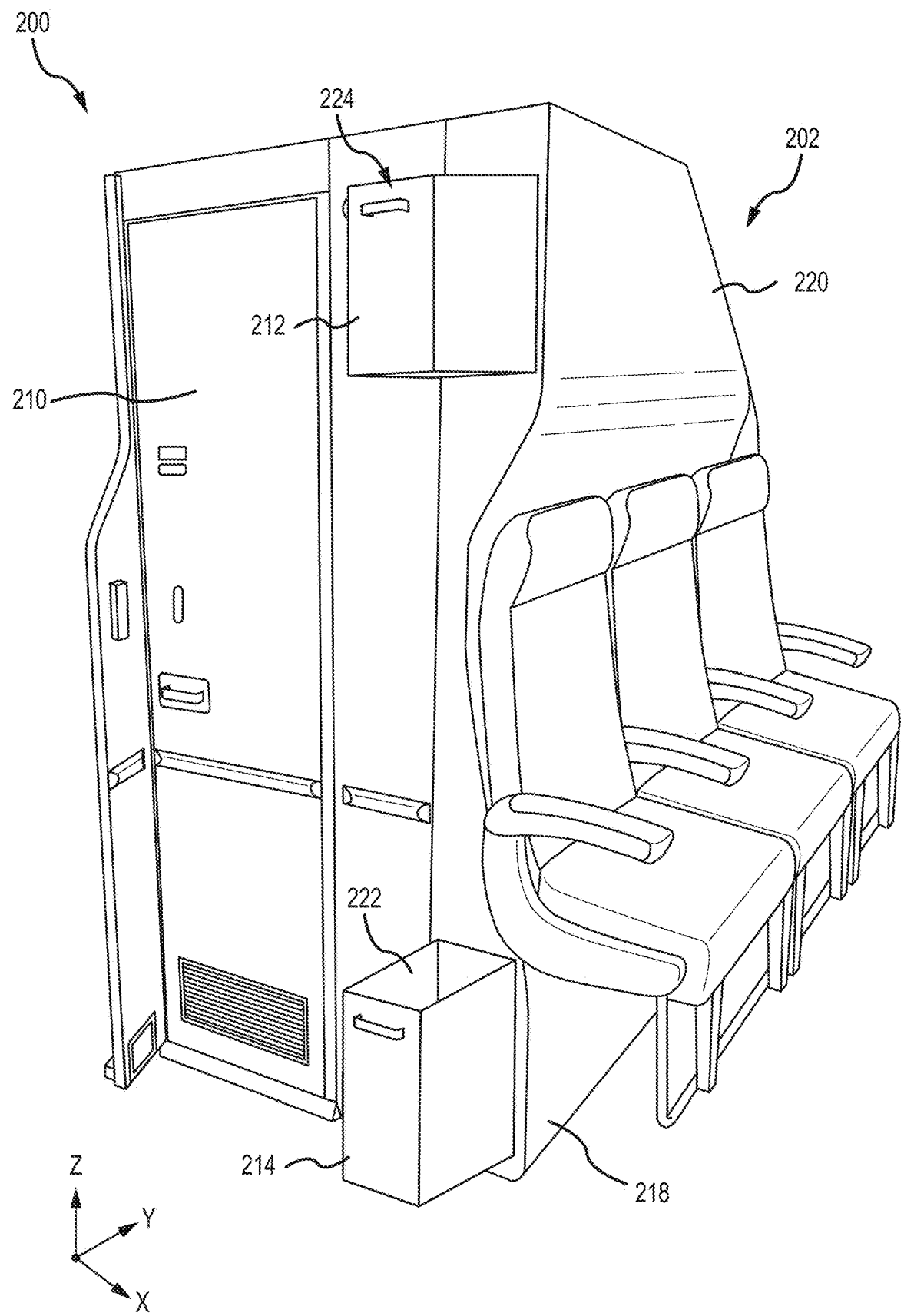

Referring now to FIGS. 2A and 2B, a large lavatory 200 is illustrated, in accordance with various embodiments. In various embodiments, large lavatory 200 may be an example of lavatory monuments 104, 106, described above in FIG. 1. Large lavatory 200 includes a forward wall 202, an aft wall 204, an outboard wall 206, an inboard wall 208, and a door 210. In various embodiments, large lavatory 200 further includes an upper storage access 212 and a lower storage access 214. In various embodiments, forward wall 202 may wrap around one or more seats 216. That is, forward wall may be configured to be positioned adjacent the one or more seats 216 with little to no space between forward wall 202 and the one or more seats 216. Large lavatory 200 has a first height h1, a first width w1 along the top (e.g., in the positive z-direction), and a second width w2 along the bottom (e.g., in the negative z-direction). In various embodiments, first height h1 may be about 70 inches (about 178 centimeters) to about 80 inches (about 203 centimeters), and more specifically, about 75 inches (about 191 centimeters) to about 77 inches (about 196 centimeters). In various embodiments, first width w1 may be about 36 inches (about 91.4 centimeters) to about 65 inches (about 165 centimeters), and more specifically, about 40 inches (about 102 centimeters) to about 60 inches (about 152 centimeters). In various embodiments, second width w2 may be about 25 inches (about 63.5 centimeters) to about 60 inches (about 152 centimeters), and more specifically, about 30 inches (about 76.2 centimeters) to about 48 inches (about 122 centimeters). In various embodiments, second width w2 is about 60% to about 90% of first width w1, and more specifically, about 70% to about 80% of first width w1.

Forward wall 202 includes a lower portion 218 and an upper portion 220. Lower portion 218 has a second height h2 and upper portion has a third height h3. In various embodiments, second height h2 is about 40 inches (about 102 centimeters) to about 60 inches (about 152 centimeters), and more specifically, about 45 inches (about 114 centimeters) to about 55 inches (about 140 centimeters). In various embodiments, third height h3 is about 20 inches (about 50.8 centimeters) to about 60 inches (about 152 centimeters), and more specifically, about 25 inches (about 63.5 centimeters) to about 35 inches (about 88.9 centimeters). In various embodiments, second height is about 50% to about 80% of first height h1, and more specifically, about 60% to about 70% of first height h1.

Lower portion 218, in various embodiments, may extend upward (e.g., along the z-axis) behind the one or more seats 216. In various embodiments, lower portion 218 may extend upward (e.g., in the positive z-direction) and curve slightly inward (e.g., in the negative x-direction), being contoured to the one or more seats 216. In other words, lower portion 218 may be directly adjacent the one or more seats 216. In various embodiments, lower portion 218 may physically contact the one or more seats 216. In various embodiments, a lower storage compartment 222 may be disposed within lower portion 218 (i.e., aft of forward wall 202).

Upper portion 220, in various embodiments, may extend upward (e.g., along the z-axis) from lower portion 218. In various embodiments, as illustrated in FIG. 2A, upper portion 220 may extend upward (e.g., in the positive z-direction) and curve outward away from lower portion 218 (e.g., in the positive x-direction). That is, upper portion 220 may bulge outward away from large lavatory 200 and over the one or more seats 216. In various embodiments, an upper storage compartment 224 may be disposed within upper portion 220 (i.e., aft of forward wall 202).

Door 210 has a third width w3 extending between one side (e.g., aft wall 204) of large lavatory 200 and the other side (e.g., forward wall 202). In various embodiments, third width w3 may be about 18 inches (about 45.7 centimeters) to about 24 inches (about 61 centimeters), and more specifically, about 20 inches (about 50.8 centimeters) to about 22 inches (about 55.9 centimeters). In various embodiments, third width w3 may be about 40% to about 90% of first width w1, and more specifically, about 60% to about 70% of first width w1. In various embodiments, door 210 may be a standard size lavatory door, as illustrated in FIG. 2A. In various embodiments, door 210 may be a single panel door. In various embodiments, door 210 may be a two panel bi-fold door.

Large lavatory 200, in various embodiments, may be separated, or divided, vertically (e.g., along the z-axis) along the line A-A into an aft side 200a and a forward side 200b for transportation through an aircraft door. Aft side 200a of large lavatory 200 (e.g., in the negative x-direction) has a fourth width w4 and forward side 200b of large lavatory 200 (e.g., in the positive x-direction) has fourth width w5. In various embodiments, w4 is less than w5. In various embodiments, w4 is about equal to w5. In various embodiments, w4 is greater than w5. That is, large lavatory 200 may be separate into two components, transported into the cabin of the aircraft through a door, and reassembled in place. The line along with large lavatory 200 may be separated is line A-A. The one or more seats 216 may be installed and/or coupled to large lavatory 200 after large lavatory 200 is assembled inside of the aircraft cabin.

Upper storage access 212 and lower storage access 214 are illustrated in a closed position in FIG. 2A and in an open position in FIG. 2B. Upper storage access 212 provides access to upper storage compartment 224 disposed within upper portion 220. Lower storage access 214 provides access to lower storage compartment 222 disposed within lower portion 218. In various embodiments, upper storage access 212 and/or lower storage access 214 may include a pull out drawer (as illustrated in FIG. 2B). In various embodiments, upper storage access 212 and/or lower storage access 214 may include a door that opens into an aisle providing access to upper storage compartment 224 and lower storage compartment 222, respectively. In various embodiments, upper storage compartment 224 and/or lower storage compartment 222 may be accessible from inside large lavatory 200. In various embodiments, lower storage access 214 may provide access to a trashcan inside large lavatory 200. Upper storage access 212 and lower storage access 214 provide access to supplies stored in upper storage compartment 224 and lower storage compartment 222, respectively, without the crew member entering large lavatory 200.

As illustrated in FIGS. 2A and 2B, large lavatory 200 may be used with existing cabin layouts and plans. That is, an aircraft may be retrofitted to include large lavatory 200 in the place of an existing lavatory with little to no changes to the seating layout (e.g., seats 112 in FIG. 1). Large lavatory 200 further provides improved space for users including persons with reduced mobility.

Figure 3:
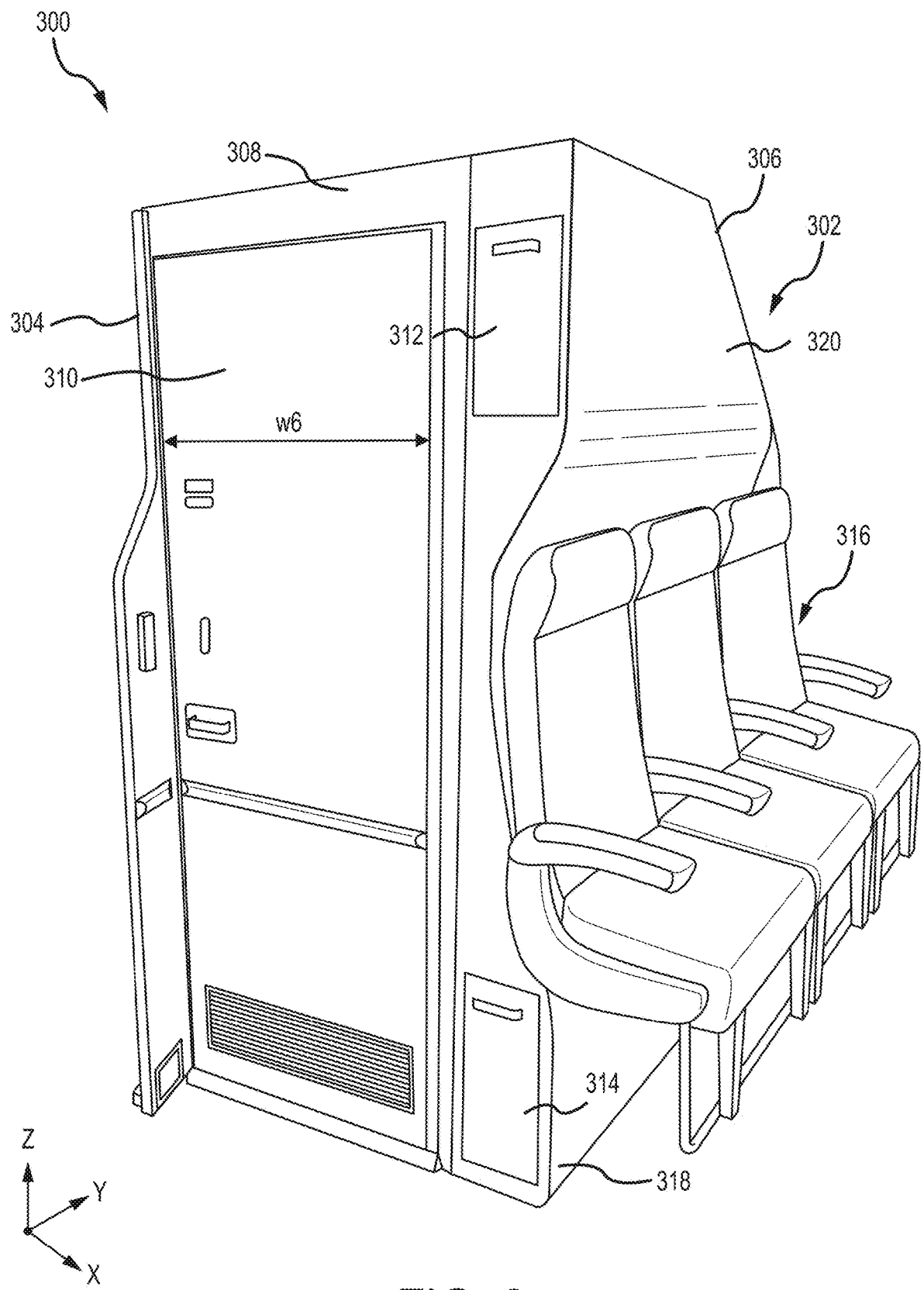
FIG. 3 illustrates an exterior view of a large lavatory for an aircraft, in accordance with various embodiments.

Referring now to FIG. 3, a large lavatory 300 is illustrated, in accordance with various embodiments. Large lavatory 300 includes similar components as large lavatory 200 including a forward wall 302, an aft wall 304, an outboard wall 306, an inboard wall 308, upper storage access 312, and lower storage access 314 descriptions of which may not be repeated below. Large lavatory 300 further includes a door 310 that is wider than conventional aircraft lavatory doors. Door 310 has a sixth width w6. In various embodiments, sixth width w6 may be about 28 inches (about 71.1 centimeters) to about 56 inches (about 142 centimeters), and more specifically, about 36 inches (about 91.4 centimeters) to about 48 inches (about 122 centimeters). In various embodiments, sixth width w6 may be about 70% to about 95% of second width w2, and more specifically, about 80% to about 90% of second width w2. In various embodiments, door 310 may be a single panel door. In various embodiments, door 310 may be two panel, bi-fold door.

Figure 4:
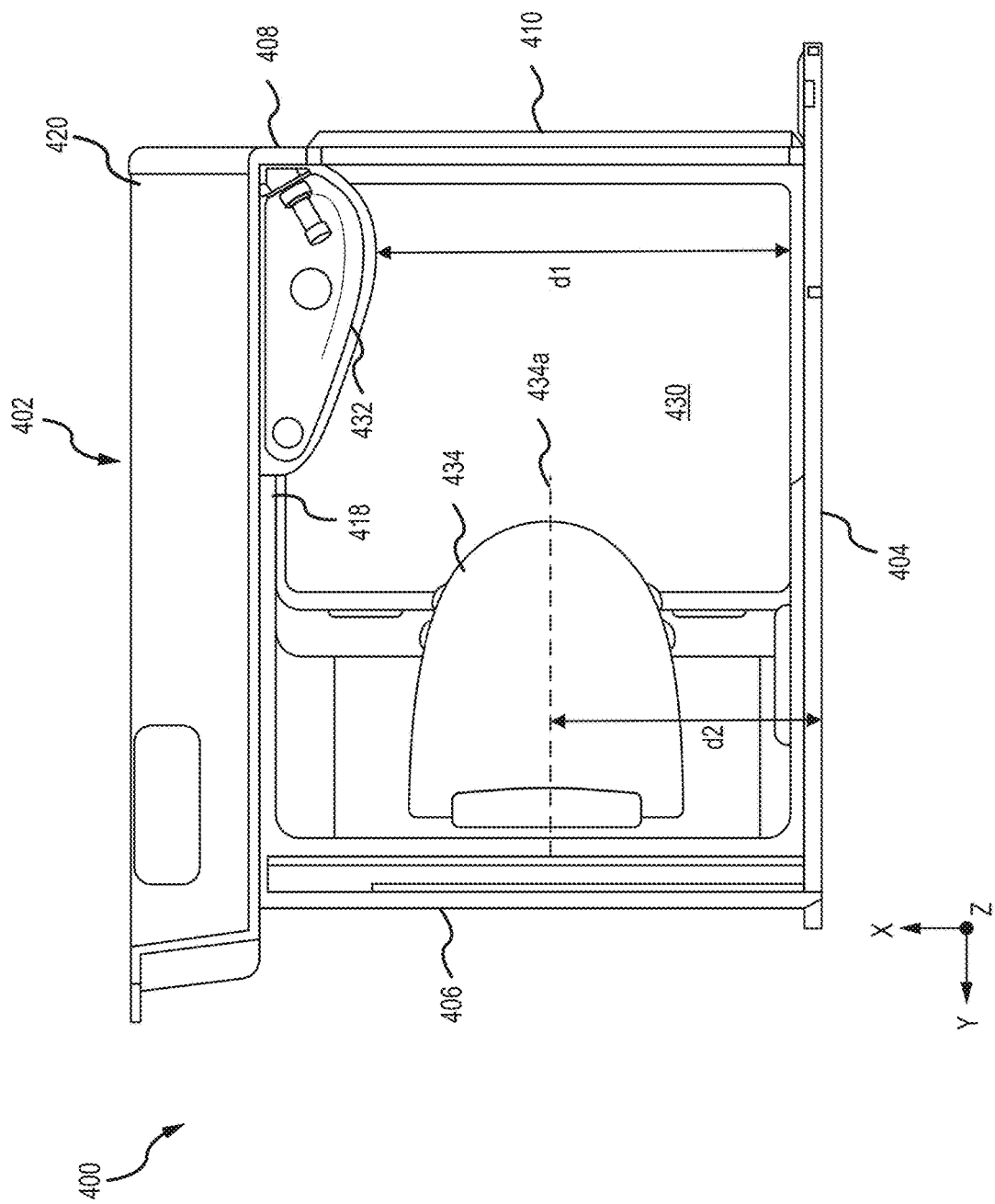
FIG. 4 illustrates an interior view of a large lavatory configuration, in accordance with various embodiments.

Referring now to FIG. 4, a top down cross section view of a lavatory configuration 400 of large lavatory 200, 300 is illustrated, in accordance with various embodiments. Configuration 400 includes a forward wall 402, an aft wall 404, an outboard wall 406, an inboard wall 408, a door 410, a floor 430, a small sink 432, and a toilet 434. Forward wall 402 includes a lower portion 418 and an upper portion 420. Upper portion 420 extends forward (e.g., in the positive x-direction) as described above in FIG. 2.

Small sink 432 may be coupled to forward wall 402 (as illustrated in FIG. 4) and adjacent inboard wall 408 and door 410. In various embodiments, small sink 432 may be coupled to aft wall 404. There is a first distance d1 from small sink 432 to aft wall 404. In various embodiments, distance d1 may be about 17 inches (about 43.2 centimeters) to about 26 inches (about 66 centimeters), and more specifically, about 22 inches (about 55.9 centimeters) to about 25 inches (about 63.5 centimeters). Configuration 400 of large lavatory 200 provides greater interior space than conventional aircraft lavatories.

Toilet 434 may be coupled to outboard wall 406 (as illustrated in FIG. 4) and centered between forward wall 402 and aft wall 404. There is a second distance d2 from a centerline 434a of toilet 434 to aft wall 404. In various embodiments, second distance d2 may be about 11 inches (about 27.9 centimeters) to about 16 inches (about 40.6 centimeters), and more specifically, about 12 inches (about 30.5 centimeters) to about 15 inches (about 38.1 centimeters). Configuration 400 of large lavatory 200 provides more interior space for a passenger using toilet 434 and small sink 432 than conventional aircraft lavatories. The extra interior space may be more comfortable for larger passengers and/or those with physical disabilities. Furthermore, passengers may feel less claustrophobic in large lavatory 200 as compared to conventional aircraft lavatories.

In various embodiments, configuration 400 further includes a lower storage compartment and/or an upper storage compartment. In various embodiments, lower storage compartment may be located within lower portion 418 of forward wall 402 and may be accessible below small sink 432. In various embodiments, upper storage compartment may be located within upper portion 420 of forward wall 402 and may be accessible above small sink 432. In various embodiments, configuration 400 may further include a vanity (e.g., a mirror) that may be moved to access upper storage compartment.

Figure 5:
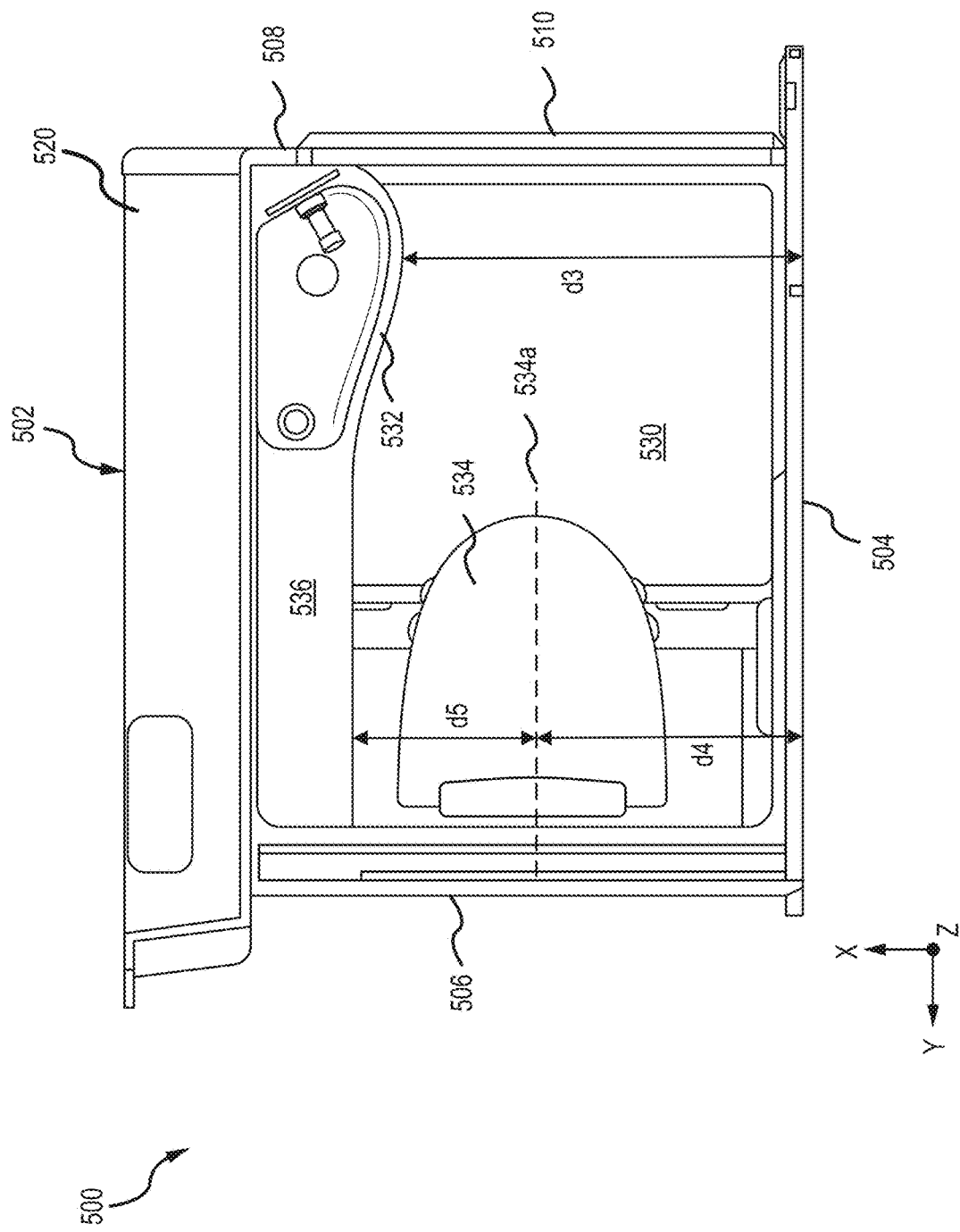
FIG. 5 illustrates an interior view of a large lavatory configuration, in accordance with various embodiments.

Referring now to FIG. 5, a top down cross section view of a lavatory configuration 500 of large lavatory 200, 300 is illustrated, in accordance with various embodiments. Configuration 500 includes similar components as configuration 400 including a forward wall 502, an aft wall 504, an outboard wall 506, an inboard wall 508, a floor 530, a toilet 534, a door 510, lower portion, and upper portion 520, descriptions of which may not be repeated below. Configuration 500 further includes a large sink 532 and a counter 536.

Counter 536 may be coupled to forward wall 502 (as illustrated in FIG. 5). In various embodiments, counter 536 may be coupled to aft wall 504. In various embodiments, counter 536 may extend from large sink 532 to outboard wall 506. In various embodiments, counter 536 may extend between large sink 532 and outboard wall 506 but not reach outboard wall 506.

Large sink 532 may be coupled to forward wall 502 (as illustrated in FIG. 5) and adjacent inboard wall 508, door 510, and counter 536. In various embodiments, large sink 532 may be coupled to aft wall 504. Large sink 532 is larger than small sink 432 in width (e.g., in the x-direction) and/or length (e.g., in the y-direction). There is a third distance d3 from large sink 532 to aft wall 504. Third distance d3 is less than first distance d1. In various embodiments, third distance d3 may be about 15 inches (about 38.1 centimeters) to about 25 inches (about 63.5 centimeters), and more specifically, about 18 inches (about 45.7 centimeters) to about 23 inches (about 58.4 centimeters). Configuration 500 of large lavatory 200 provides less interior space than configuration 400 but may be considered more comfortable for passengers due to the counter 536 and large sink 532.

Toilet 534 may be coupled to outboard wall 506 (as illustrated in FIG. 5) and centered between forward wall 502 and aft wall 504. There is a fourth distance d4 from a centerline 534a of toilet 534 to aft wall 504 and a fifth distance d5 from centerline 534a to counter 536. In various embodiments, fourth distance d4 may be about 11 inches (about 27.9 centimeters) to about 16 inches (about 40.6 centimeters), and more specifically, about 12 inches (about 30.5 centimeters) to about 15 inches (about 38.1 centimeters). Fifth distance d5 is less than fourth distance d4.

Figure 6:
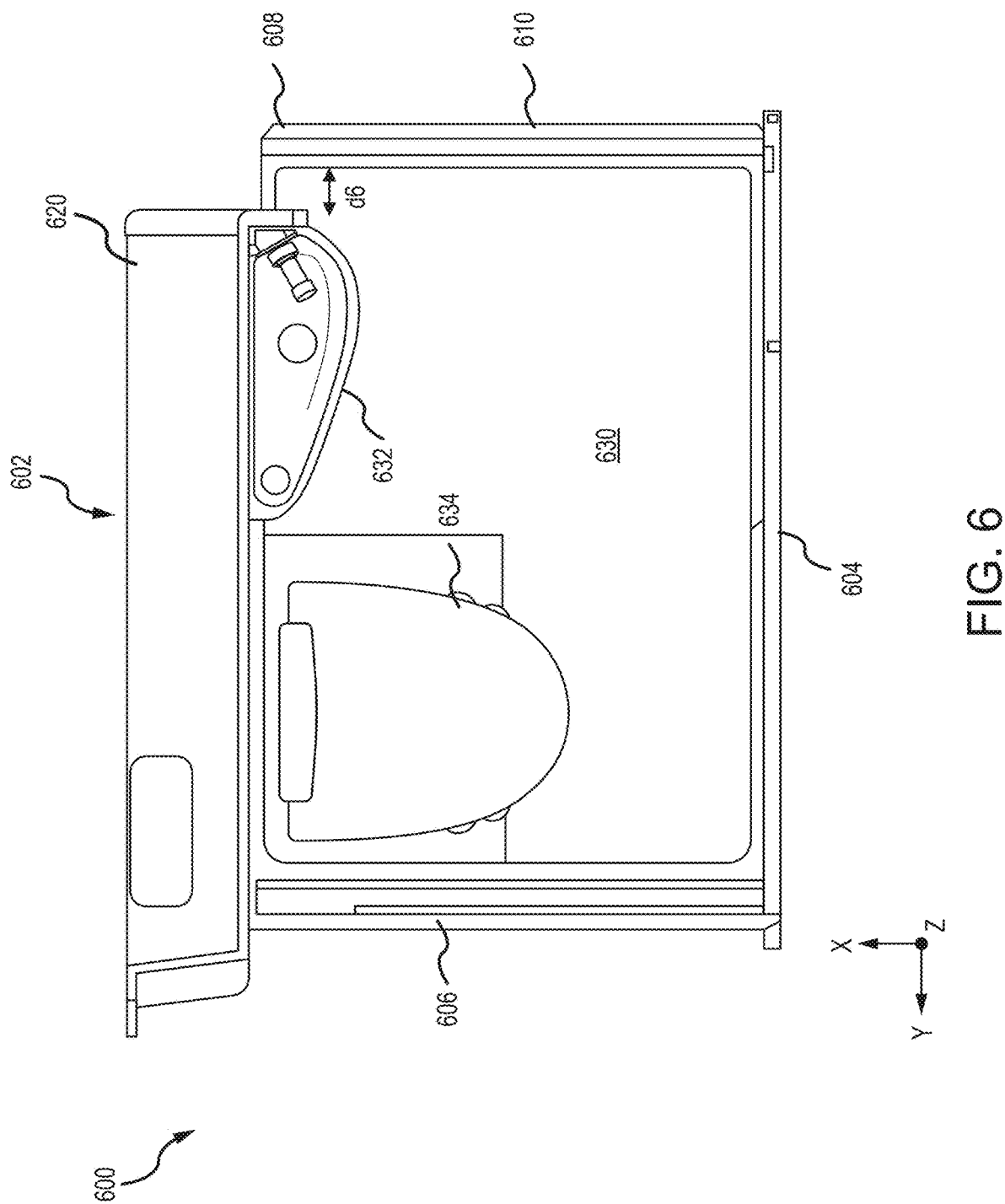
FIG. 6 illustrates an interior view of a large lavatory configuration, in accordance with various embodiments.

Referring now to FIG. 6, a top down cross section view of a lavatory configuration 600 of large lavatory 200, 300 is illustrated, in accordance with various embodiments. Configuration 600 includes similar components as configuration 400 including a forward wall 602, an aft wall 604, an outboard wall 606, an inboard wall 608, a floor 630, a toilet 634, a door 610, lower portion, and upper portion 620, descriptions of which may not be repeated below. Configuration 600 further includes a sink 632. In various embodiments, sink 632 may be an example of small sink 432. In various embodiments, sink 632 may be an example of large sink 532.

Inboard wall 608 of configuration 600 is moved inboard a sixth distance d6. In various embodiments, sixth distance d6 may be about 1 inch (about 2.54 centimeters) to about 5 inches (about 12.7 centimeters), and more specifically, about 2 inches (about 5.08 centimeters) to about 4 inches (about 10.2 centimeters). This provides more space inside large lavatory 200 as compared to conventional lavatories and configurations 400, 500 of large lavatory 200. In various embodiments, sink 632 may extend to inboard wall 608. The extra interior space may be more comfortable for larger passengers and/or those with physical disabilities. Furthermore, passengers may feel less claustrophobic in large lavatory 200 as compared to conventional aircraft lavatories. Additionally, or in the alternatively, the extra space may provide additional leg room for a seated passenger.

Toilet 634 may be coupled to forward wall 602 (as illustrated in FIG. 6) and centered between sink 632 and outboard wall 606. In various embodiments, toilet 634 may be coupled to aft wall 604. In this configuration, toilet 634 provides more leg room than conventional aircraft lavatories.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft lavatory, comprising:
    an aft wall;
    a forward wall including an upper portion and a lower portion, the lower portion configured to be directly adjacent one or more seats, and the upper portion configured to extend over the one or more seats;
    an outboard wall coupled to the forward wall and the aft wall;
    an inboard wall coupled to the forward wall and the aft wall, the inboard wall defining an opening to access the aircraft lavatory;
    a toilet coupled to the outboard wall and having a centerline, the toilet disposed along the outboard wall such that the centerline is disposed between 12 and 15 inches from the aft wall;
    a sink coupled to the forward wall and disposed such that a greatest protrusion of the sink from the forward wall is disposed between 22 and 25 inches from the aft wall;
    an upper storage compartment partially defined by the upper portion;
    an interior access to the upper storage compartment disposed on the forward wall above the sink; and
    an exterior access to the upper storage compartment disposed on the inboard wall,
    wherein each of the outboard wall and the inboard wall are configured to be separated into an aft side and a forward side.

2. The aircraft lavatory of claim 1, further comprising:
    a lower storage compartment partially defined by the lower portion;
    an interior access to the lower storage compartment disposed on the forward wall below the sink; and
    an exterior access to the lower storage compartment disposed on the inboard wall.

3. The aircraft lavatory of claim 1, wherein the toilet is centered between the forward wall and the aft wall.

4. The aircraft lavatory of claim 1, further comprising:
    a door coupled to the inboard wall and configured to secure the opening, wherein the inboard wall has a first width and the door has a second width.

5. The aircraft lavatory of claim 4, wherein the second width is about 80% to about 90% of the first width.

6. The aircraft lavatory of claim 4, wherein the second width is about 70% to about 95% of the first width.

7. An aircraft, comprising:
    at least one lavatory, wherein the at least one lavatory includes:
    an aft wall;
    a forward wall including an upper portion and a lower portion, the lower portion configured to be directly adjacent one or more seats, and the upper portion configured to extend over the one or more seats;
    an outboard wall coupled to the forward wall and the aft wall;
    an inboard wall coupled to the forward wall and the aft wall, the inboard wall defining an opening to access the at least one lavatory;
    a toilet coupled to the outboard wall and having a centerline, the toilet disposed along the outboard wall such that the centerline is disposed between 12 and 15 inches from the aft wall;
    a sink coupled to the forward wall and disposed such that a greatest protrusion of the sink from the forward wall is disposed between 22 and 25 inches from the aft wall;
    an upper storage compartment partially defined by the upper portion;
    an interior access to the upper storage compartment disposed on the forward wall above the sink; and
    an exterior access to the upper storage compartment disposed on the inboard wall,
    wherein each of the outboard wall and the inboard wall are configured to be separated into an aft side and a forward side.

8. The aircraft of claim 7, further comprising:
    a doorway into the aircraft having a first width, wherein the forward side has a second width that is less than the first width, the aft side has a third width that is less than the first width, and the second width and the third width combined are greater than the first width.

9. The aircraft of claim 7, wherein the at least one lavatory further comprises:
    a lower storage compartment partially defined by the lower portion;
    an interior access to the lower storage compartment disposed on the forward wall below the sink; and an exterior access to the lower storage compartment disposed on the inboard wall.

10. The aircraft of claim 7, wherein the at least one lavatory further comprises:
a door coupled to the inboard wall and configured to secure the opening, wherein the inboard wall has a first width and the door has a second width.

11. The aircraft of claim 10, wherein the second width is about 80% to about 90% of the first width.

12. The aircraft of claim 10, wherein the second width is about 70% to about 95% of the first width.

13. An aircraft lavatory, comprising:
an aft wall;
a forward wall including an upper portion and a lower portion, the lower portion configured to be directly adjacent one or more seats, and the upper portion configured to extend over the one or more seats;
an outboard wall coupled to the forward wall and the aft wall;
an inboard wall coupled to the forward wall and the aft wall, the inboard wall defining an opening to access the aircraft lavatory;
a toilet coupled to the forward wall;
a sink coupled to the forward wall adjacent the toilet and disposed such that a greatest protrusion of the sink from the forward wall is disposed between 22 and 25 inches from the aft wall;
an upper storage compartment partially defined by the upper portion;
an interior access to the upper storage compartment disposed on the forward wall above the sink; and
an exterior access to the upper storage compartment disposed on the inboard wall,
wherein each of the outboard wall and the inboard wall are configured to be separated into an aft side and a forward side.

14. The aircraft lavatory of claim 13, further comprising a gap between 2 inches and 4 inches disposed between the sink and the inboard wall along the forward wall.

15. The aircraft lavatory of claim 13, further comprising:
a lower storage compartment partially defined by the lower portion;
an interior access to the lower storage compartment disposed on the forward wall below the sink; and
an exterior access to the lower storage compartment disposed on the inboard wall.

* * * * *